Jan. 20, 1959 R. E. MAYO 2,869,659
AIR COOLING FOR TRACTOR STEERING MECHANISM
Filed April 4, 1955 2 Sheets-Sheet 1
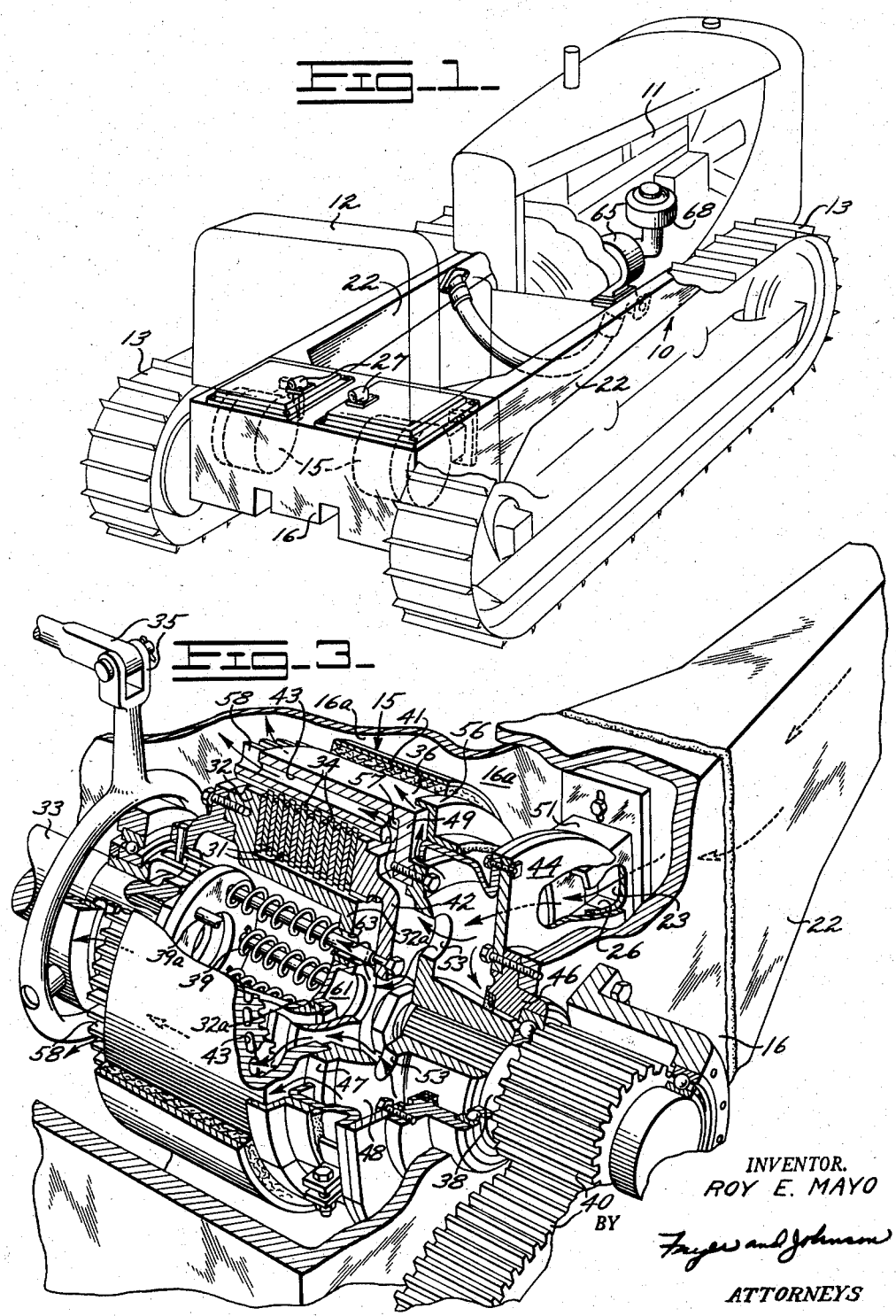
INVENTOR.
ROY E. MAYO
BY
Fryer and Johnson
ATTORNEYS

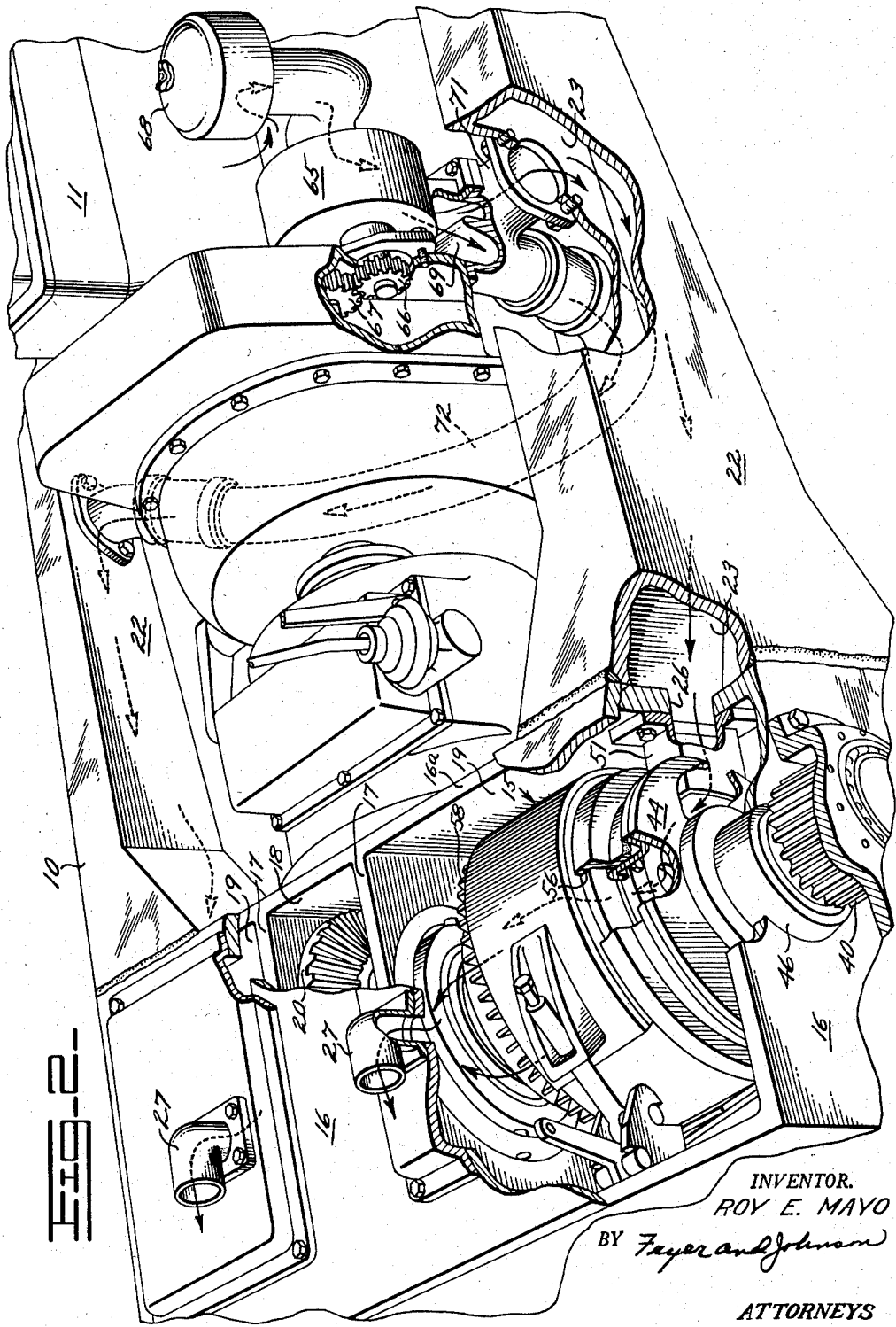

United States Patent Office 2,869,659
Patented Jan. 20, 1959

2,869,659

AIR COOLING FOR TRACTOR STEERING MECHANISM

Roy E. Mayo, Peoria, Ill., assignor to Caterpillar Tractor Company, Peoria, Ill., a corporation of California Application April 4, 1955, Serial No. 498,838

3 Claims. (Cl. 180—6.2)

This invention relates generally to cooling systems for the drive elements of traction implements and more particularly to a system for cooling the steering brakes and clutches of traction implements that employ the steering by driving principle.

In self propelled vehicles such as track-type tractors having an endless track at each side of the machine, steering is usually effected by control of the drive to each of said endless tracks by means of releasable drive establishing means in the form of friction steering clutches. Such clutches generally comprise a driving member having spaced clutch discs or plates slidably secured thereto and a driven member also having spaced clutch discs or plates slidably secured thereto and interposed between the clutch plates of the driving member. Spring means in combination with a pressure plate acting against the clutch plates frictionally connect the driving member with the driven member to drive each endless track through suitable gearing associated therewith.

Each pressure plate may be actuated by suitable controls in the operator's station of the tractor to vary the frictional load imposed upon the clutch discs.

When a minimum or substantially no pressure is applied on the clutch plates, the drive is completely released but by appling varying degrees of pressure on the clutch plates, less than the maximum amount, the clutch plates are maintained in light frictional engagement at which time slippage of the clutch obtains, enabling partial transmission of the drive depending on the extent of the pressure applied. A brake is associated with each of the traction means, usually the driven member, and may be applied when the associated steering clutch is disengaged. By the described arrangement, a vehicle may be turned sharply in one direction or the other when either one or the other steering clutches is completely disengaged and the associated brake applied. By slipping of either steering clutch, steering may be effected along a greater arc depending upon the extent of such slipping.

In this type of control, especially in large size tractors where steering clutches are generally large, the friction of the steering clutch plates as well as the brakes, creates excessive thermal conditions in the body of the driven member specially in the areas adjacent the brakes resulting in rapid wear of the braking material. Although many attempts have been made to provide efficient means for cooling these areas, none are known that have adequately cooled these components sufficiently. It is, therefore, an object of this invention to provide means for cooling the steering mechanism of a track-type tractor or the like. A further object is to provide means whereby air is conducted into the steering clutch mechanisms in such a manner so as to provide efficient cooling in the areas most affected by such frictional drives. Another important object is to provide an engine mounted blower to furnish a pressurized flow of air into the steering mechanism. Still another important object is to provide means in the main frame of a tractor whereby the frame is utilized to convey air into the clutch members. Further and more specific objects and advantages of this invention are made apparent in the following specification wherein reference is made to the accompanying drawings.

In the drawings:

Fig. 1 is a perspective view of a tractor embodying the invention, portions of the tractor being shown schematically to illustrate the environment in which the components parts thereof are employed, Fig. 2 is an enlarged perspective view of a portion of the tractor frame and engine with parts broken away to illustrate the details of the various parts of the invention and indicating the air flow from the blower through the steering clutches, and Fig. 3 is a similar view in perspective of a portion of the frame and steering clutch compartment with parts of the frame and clutch broken away to show the arrangement of the various components thereof.

For purposes of illustration, the invention is shown embodied in a track-type tractor where it is particularly adapted. However, it is equally applicable in any type of vehicle where steering is effected by control of drive establishing means to associated traction means.

With reference to Fig. 1, a track-type tractor is shown comprising a main frame generally indicated at 10, an engine 11, an operator's station 12 and endless track mechanisms 13 at each side of the tractor by which the tractor is propelled along the ground. The endless track mechanisms 13 are usually pivotally connected to the main frame 10 adjacent their rear ends for relative oscillatory movement with respect to the frame, and the front of the tractor frame is supported on said endless track mechanisms by means of suitable equalizer mechanisms (not shown).

The main frame or body 10 of my invention upon which engine 11 and operator station 12 are mounted and to which the endless track mechanisms 13 are hingedly connected for relative oscillation therewith is composed essentially of two main parts. One of these parts comprises a rear case 16 adapted to contain drive mechanism, a portion of which is indicated at 20 in Fig. 2 and the steering clutch mechanisms generally indicated at 15. The case 16 is separated into compartments as by suitable partitions 17 so as to provide a wet compartment 18 for the drive mechanism 20 and two adjacent laterally disposed dry compartments 19 which contain the steering clutches 15. Each clutch 15 permits control for drive-steering its respective endless track mechanism 13. The other part of the frame 10 comprises spaced side members 22 rigidly secured as by welding to a front plate 16a of the rear case 16. The side members 22 are arranged to support the engine 11 in any well-known manner and are herein disclosed as box-section beams each having an inner channel 23.

Suitable openings 26 are formed in the wall 16a to connect each inner channel 23 of the side members 22 with its respective clutch compartment 19. With this construction, air entering the channels 23 at points forwardly of the rear case 16 may be conveyed into the clutch compartments 19 of said case through openings 26 in the wall 16a thereof to cool each clutch compartment 19. Suitable exhaust means 27 associated with each compartment 19 permits the heated air to be vented to the atmosphere.

As seen in Fig. 3, clutch 15 is disclosed as comprising a plurality of friction discs or plates 31 slidably retained on a driving inner drum 32 rotating with one of the cross shafts 33 of the drive mechanism 20. A set of alternately disposed friction discs 34 are carried in sliding arrangement with a driven member 36 which, through a splined connection with a shaft 38, propels the endless track 13 along the ground whenever a frictional drive between discs 31 and 34 exists. A plurality of springs 39 and rods 39a acting between a closed end 32a of the driving drum 32 and a pressure plate 42 urge said discs 31 and 34 into engagement to drive each endless track 13 through its associated gearing 40.

In order to abruptly steer a track-type tractor, a friction braking material shown at 41 engages the cylindrical surface of the driven member 36 so that when the frictional drive of plates 31 and 34 is disengaged through suitable manual control means indicated at 35 braking pressure applied by the friction material 41 stops the rotational movement of the driven member and thereby stops the drive to its respective endless track. The heat created by such frictional engagement of the braking material to the driven member is excessive, especially in larger size tractors, and it has been found that the life of such friction material is relatively short.

To prolong the life of the braking material, the driven member 36, as disclosed in Fig. 3, includes a plurality of air passages 43 formed within the driven member 36 adjacent its cylindrical brake surface.

Each clutch 15 is also provided with an annular shroud 44 non-rotatably secured to a bearing cage 46 in each side of case 16 and in close proximity to a peripheral surface 47 of a circular flange 48 which is bolted to a flange portion 49 of the driven drum 36. A duct 51 associated with each shroud 44 and registering with each opening 26 in wall 16a provides suitable passage for air entering the shroud from the chamber 23. Thus air entering the chamber 23 is conducted through the clutch by way of duct 51, shroud 44 and a plurality of apertures 53 formed in the circular flange 48. Thence it passes through a space defined between said flange 48 and the pressure plate 42, through the passages 43 to cool the clutch drum in the areas immediately adjacent the brake material 41 and the ends of discs 34.

A certain amount of air is permitted to pass between the shroud 44 and the peripheral surface 47 of the flange 48. A circumferential director 56, integrated with the shroud 44 as by welding, directs a stream of air toward the brake material 41, externally of the driven drum 36.

The air is impelled through passages 43 by the provision of impeller vanes 57 integrated with the drum 36 and interposed between the passages 43; thereby inducing positive air flow as the drum 36 rotates.

To further cool the drum surface, a plurality of fins 58 extending axially from the drum additionally impels the flow of warm air and also assists in dissipating the heat from the body of the drum by radiation.

In order to insure that the air is directed to the most critical areas of heat, a plug 61 is retained in an opening usually existing in the closed end 32a of said inner driving member so that air passing between the pressure plate 42 and the closed end 32a of said driving member 32 will be directed through enlarged openings 63 in said closed end through which rods 39a pass to cool the clutch springs 39.

In large capacity tractors it is desirable to provide a forced flow of air to cool the clutches. As best seen in Figs. 1 and 2, a blower shown at 65 is driven by the engine in any suitable manner such as by a gear 66 meshing with a gear 67 which forms a part of the rear timing gear train of the engine. An air cleaner 68 on the intake side of the blower 65 filters intake air which is then discharged through a divided opening 69 and suitable conduits 71 and 72 to each side frame 22 of the tractor main frame 10.

With this arrangement, it may be desirable to close the forward ends of each side frame to prevent the escape of air therefrom and pressurize the channel 23 to provide a forced air-flow of elevated pressure to cool the steering means.

I claim:

1. A tractor frame comprising a housing and transversely spaced forwardly extending hollow beam members for support of an engine, said housing containing drive mechanism and friction steering clutches in separate compartments, each clutch comprising a driving member and a driven member associated with said drive mechanism, said beam members being connected to said housing directly adjacent the clutch compartments, friction brake means associated with each driven member, passages formed in the body of each steering clutch, and a shroud associated with each clutch and joined with each hollow beam whereby air is conducted from the beams through the clutch to cool the areas adjacent the brake means.

2. A tractor frame comprising a housing and transversely spaced forwardly extending hollow beam members for support of an engine, said housing containing drive mechanism and friction steering clutches in separate compartments, each clutch comprising a driving member and a driven member associated with said drive mechanism; said beam members being connected to said housing directly adjacent the clutch compartments, friction brake means associated with each driven member, passages formed in the body of each steering clutch and a shroud associated with each clutch and joined with said hollow beams whereby air is conducted from the beams through the clutch to cool the areas adjacent the brake means, and a vent in each clutch compartment.

3. A tractor frame comprising a housing and transversely spaced forwardly extending hollow beam members for support of an engine, said housing containing drive mechanism and friction steering clutches in separate compartments, each clutch comprising a driving member and a driven member associated with said drive mechanism; said beam members being connected to said housing directly adjacent the clutch compartments, friction brake means associated with each driven member, passages formed in the body of each steering clutch, and a shroud associated with each clutch and joined with said hollow beams whereby air is conducted from the beams through the clutch to cool the areas adjacent the brake means, deflector means associated with said shroud to permit a limited air flow to be directed toward the friction brakes externally of said driven member, and a vent in each clutch compartment.

References Cited in the file of this patent

UNITED STATES PATENTS

| | | |
|---|---|---|
| 872,607 | Bryan | Dec. 3, 1907 |
| 1,303,003 | Adams | May 6, 1919 |
| 2,130,131 | Hirshfeld | Sept. 13, 1938 |
| 2,198,792 | Schjolin | Apr. 30, 1940 |
| 2,391,002 | Baker | Dec. 18, 1945 |
| 2,416,128 | Swennes | Feb. 18, 1947 |
| 2,551,528 | Darrin | May 1, 1951 |
| 2,667,954 | Danly | Feb. 2, 1954 |

FOREIGN PATENTS

| | | |
|---|---|---|
| 267,881 | Switzerland | July 17, 1950 |